United States Patent
Ferguson et al.

(10) Patent No.: US 8,396,836 B1
(45) Date of Patent: Mar. 12, 2013

(54) SYSTEM FOR MITIGATING FILE VIRTUALIZATION STORAGE IMPORT LATENCY

(75) Inventors: JC Ferguson, Harvard, MA (US);
Bradley E. Cain, Groton, MA (US);
Kevin Heneghan, Andover, MA (US)

(73) Assignee: F5 Networks, Inc., Seattle, WA (US)

( * ) Notice: Subject to any disclaimer, the term of this patent is extended or adjusted under 35 U.S.C. 154(b) by 4 days.

(21) Appl. No.: 13/174,748

(22) Filed: Jun. 30, 2011

(51) Int. Cl.
*G06F 7/00* (2006.01)
(52) U.S. Cl. ......... 707/652; 707/640; 709/242; 709/223
(58) Field of Classification Search .................. 707/652, 707/640, 661; 709/242, 223, 203; 715/700
See application file for complete search history.

(56) References Cited

U.S. PATENT DOCUMENTS

| | | | |
|---|---|---|---|
| 4,993,030 A | 2/1991 | Krakauer et al. |
| 5,218,695 A | 6/1993 | Noveck et al. |
| 5,282,201 A | 1/1994 | Frank et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,606,665 A | 2/1997 | Yang et al. |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |

(Continued)

FOREIGN PATENT DOCUMENTS

| AU | 2003300350 A1 | 7/2004 |
|---|---|---|
| CA | 2080530 A1 | 4/1994 |

(Continued)

OTHER PUBLICATIONS

Baer, T., et al., "The elements of Web services" ADTmag.com, Dec. 1, 2002, pp. 1-6, (http://www.adtmag.com).

(Continued)

*Primary Examiner* — Le H Luu
(74) *Attorney, Agent, or Firm* — LeClairRyan, a Professional Corporation (57) ABSTRACT

A system and method for reducing latency when re-routing at least partial client communications from a first, active data center site to a second data center site due to a virtualization service disruption. Configuration data is imported from the first file virtualization device, wherein the configuration data represents object relationships and mapping information between components in the first data center site and the second data center site. An instruction is received for the back-up file virtualization device to begin handling at least one virtualization service that is disrupted at the first data center site. A most recent import of the configuration data is loaded for the one or more disrupted virtualization services and enabled such that the back-up file virtualization device performs the disrupted virtualization service with one or more storage devices in the second data center site using the at least a portion of the imported configuration data.

20 Claims, 3 Drawing Sheets

U.S. PATENT DOCUMENTS

| | | | |
|---|---|---|---|
| 5,724,512 A | 3/1998 | Winterbottom | |
| 5,806,061 A | 9/1998 | Chaudhuri et al. | |
| 5,832,496 A | 11/1998 | Anand et al. | |
| 5,832,522 A | 11/1998 | Blickenstaff et al. | |
| 5,838,970 A | 11/1998 | Thomas | |
| 5,862,325 A | 1/1999 | Reed et al. | |
| 5,884,303 A | 3/1999 | Brown | |
| 5,893,086 A | 4/1999 | Schmuck et al. | |
| 5,897,638 A | 4/1999 | Lasser et al. | |
| 5,905,990 A | 5/1999 | Inglett | |
| 5,917,998 A | 6/1999 | Cabrera et al. | |
| 5,920,873 A | 7/1999 | Van Huben et al. | |
| 5,937,406 A | 8/1999 | Balabine et al. | |
| 5,991,302 A | 11/1999 | Berl et al. | |
| 5,995,491 A | 11/1999 | Richter et al. | |
| 5,999,664 A | 12/1999 | Mahoney et al. | |
| 6,012,083 A | 1/2000 | Savitzky et al. | |
| 6,029,168 A | 2/2000 | Frey | |
| 6,029,175 A | 2/2000 | Chow et al. | |
| 6,041,365 A | 3/2000 | Kleinerman | |
| 6,044,367 A | 3/2000 | Wolff | |
| 6,047,129 A | 4/2000 | Frye | |
| 6,067,558 A | 5/2000 | Wendt et al. | |
| 6,072,942 A | 6/2000 | Stockwell et al. | |
| 6,078,929 A | 6/2000 | Rao | |
| 6,085,234 A | 7/2000 | Pitts et al. | |
| 6,088,694 A | 7/2000 | Burns et al. | |
| 6,104,706 A | 8/2000 | Richter et al. | |
| 6,128,627 A | 10/2000 | Mattis et al. | |
| 6,128,717 A | 10/2000 | Harrison et al. | |
| 6,154,777 A | 11/2000 | Ebrahim | |
| 6,161,145 A | 12/2000 | Bainbridge et al. | |
| 6,161,185 A | 12/2000 | Guthrie et al. | |
| 6,181,336 B1 | 1/2001 | Chiu et al. | |
| 6,202,156 B1 | 3/2001 | Kalajan | |
| 6,223,206 B1 | 4/2001 | Dan et al. | |
| 6,233,648 B1 | 5/2001 | Tomita | |
| 6,237,008 B1 | 5/2001 | Beal et al. | |
| 6,256,031 B1 | 7/2001 | Meijer et al. | |
| 6,259,405 B1 | 7/2001 | Stewart et al. | |
| 6,260,070 B1 | 7/2001 | Shah | |
| 6,282,610 B1 | 8/2001 | Bergsten | |
| 6,289,345 B1 | 9/2001 | Yasue | |
| 6,292,832 B1 | 9/2001 | Shah et al. | |
| 6,304,913 B1 | 10/2001 | Rune | |
| 6,308,162 B1 | 10/2001 | Ouimet et al. | |
| 6,324,581 B1 | 11/2001 | Xu et al. | |
| 6,330,574 B1 | 12/2001 | Murashita | |
| 6,338,082 B1 | 1/2002 | Schneider | |
| 6,339,785 B1 | 1/2002 | Feigenbaum | |
| 6,349,343 B1 | 2/2002 | Foody et al. | |
| 6,353,848 B1 | 3/2002 | Morris | |
| 6,363,056 B1 | 3/2002 | Beigi et al. | |
| 6,370,527 B1 | 4/2002 | Singhal | |
| 6,374,263 B1 | 4/2002 | Bunger et al. | |
| 6,389,433 B1 | 5/2002 | Bolosky et al. | |
| 6,389,462 B1 | 5/2002 | Cohen et al. | |
| 6,393,581 B1 | 5/2002 | Friedman et al. | |
| 6,397,246 B1 | 5/2002 | Wolfe | |
| 6,412,004 B1 | 6/2002 | Chen et al. | |
| 6,438,595 B1 | 8/2002 | Blumenau et al. | |
| 6,446,108 B1 | 9/2002 | Rosenberg et al. | |
| 6,466,580 B1 | 10/2002 | Leung | |
| 6,469,983 B2 | 10/2002 | Narayana et al. | |
| 6,477,544 B1 | 11/2002 | Bolosky et al. | |
| 6,487,561 B1 | 11/2002 | Ofek et al. | |
| 6,493,804 B1 | 12/2002 | Soltis et al. | |
| 6,513,061 B1 | 1/2003 | Ebata et al. | |
| 6,514,085 B2 | 2/2003 | Slattery et al. | |
| 6,516,350 B1 | 2/2003 | Lumelsky et al. | |
| 6,516,351 B2 | 2/2003 | Borr | |
| 6,542,936 B1 | 4/2003 | Mayle et al. | |
| 6,549,916 B1 | 4/2003 | Sedlar | |
| 6,553,352 B2 | 4/2003 | Delurgio et al. | |
| 6,556,997 B1 | 4/2003 | Levy | |
| 6,556,998 B1 | 4/2003 | Mukherjee et al. | |
| 6,560,230 B1 | 5/2003 | Li et al. | |
| 6,578,069 B1 | 6/2003 | Hopmann et al. | |
| 6,601,101 B1 | 7/2003 | Lee et al. | |
| 6,606,663 B1 | 8/2003 | Liao et al. | |
| 6,612,490 B1 | 9/2003 | Herrendoerfer et al. | |
| 6,615,267 B1 | 9/2003 | Whalen et al. | |
| 6,654,346 B1 | 11/2003 | Mahalingaiah et al. | |
| 6,701,415 B1 | 3/2004 | Hendren, III | |
| 6,721,794 B2 | 4/2004 | Taylor et al. | |
| 6,728,704 B2 | 4/2004 | Mao et al. | |
| 6,738,357 B1 | 5/2004 | Richter et al. | |
| 6,738,790 B1 | 5/2004 | Klein et al. | |
| 6,742,035 B1 | 5/2004 | Zayas et al. | |
| 6,744,776 B1 | 6/2004 | Kalkunte et al. | |
| 6,748,420 B1 | 6/2004 | Quatrano et al. | |
| 6,754,215 B1 | 6/2004 | Arikawa et al. | |
| 6,754,699 B2 | 6/2004 | Swildens et al. | |
| 6,757,706 B1 | 6/2004 | Dong et al. | |
| 6,760,337 B1 | 7/2004 | Snyder, II et al. | |
| 6,775,673 B2 | 8/2004 | Mahalingam et al. | |
| 6,775,679 B2 | 8/2004 | Gupta | |
| 6,782,450 B2 | 8/2004 | Arnott et al. | |
| 6,795,860 B1 | 9/2004 | Shah | |
| 6,801,960 B1 | 10/2004 | Ericson et al. | |
| 6,826,613 B1 | 11/2004 | Wang et al. | |
| 6,839,761 B2 | 1/2005 | Kadyk et al. | |
| 6,847,959 B1 | 1/2005 | Arrouye et al. | |
| 6,847,970 B2 | 1/2005 | Keller et al. | |
| 6,850,997 B1 | 2/2005 | Rooney et al. | |
| 6,865,593 B1 | 3/2005 | Reshef et al. | |
| 6,868,447 B1 | 3/2005 | Slaughter et al. | |
| 6,871,221 B1 | 3/2005 | Styles | |
| 6,871,245 B2 | 3/2005 | Bradley | |
| 6,880,017 B1 | 4/2005 | Marce et al. | |
| 6,883,137 B1 | 4/2005 | Girardot et al. | |
| 6,889,249 B2 | 5/2005 | Miloushev et al. | |
| 6,914,881 B1 | 7/2005 | Mansfield et al. | |
| 6,922,688 B1 | 7/2005 | Frey, Jr. | |
| 6,934,706 B1 | 8/2005 | Mancuso et al. | |
| 6,938,039 B1 | 8/2005 | Bober et al. | |
| 6,938,059 B2 | 8/2005 | Tamer et al. | |
| 6,959,373 B2 | 10/2005 | Testardi | |
| 6,961,815 B2 | 11/2005 | Kistler et al. | |
| 6,970,924 B1 | 11/2005 | Chu et al. | |
| 6,973,455 B1 | 12/2005 | Vahalia et al. | |
| 6,973,490 B1 | 12/2005 | Robertson et al. | |
| 6,973,549 B1 | 12/2005 | Testardi | |
| 6,975,592 B1 | 12/2005 | Seddigh et al. | |
| 6,985,936 B2 | 1/2006 | Agarwalla et al. | |
| 6,985,956 B2 | 1/2006 | Luke et al. | |
| 6,986,015 B2 | 1/2006 | Testardi | |
| 6,990,074 B2 | 1/2006 | Wan et al. | |
| 6,990,114 B1 | 1/2006 | Erimli et al. | |
| 6,990,547 B2 | 1/2006 | Ulrich et al. | |
| 6,990,667 B2 | 1/2006 | Ulrich et al. | |
| 6,996,841 B2 | 2/2006 | Kadyk et al. | |
| 7,003,533 B2 | 2/2006 | Noguchi et al. | |
| 7,003,564 B2 | 2/2006 | Greuel et al. | |
| 7,006,981 B2 | 2/2006 | Rose et al. | |
| 7,010,553 B2 | 3/2006 | Chen et al. | |
| 7,013,379 B1 | 3/2006 | Testardi | |
| 7,020,644 B2 | 3/2006 | Jameson | |
| 7,020,669 B2 | 3/2006 | McCann et al. | |
| 7,023,974 B1 | 4/2006 | Brannam et al. | |
| 7,024,427 B2 | 4/2006 | Bobbitt et al. | |
| 7,039,061 B2 | 5/2006 | Connor et al. | |
| 7,051,112 B2 | 5/2006 | Dawson | |
| 7,054,998 B2 | 5/2006 | Arnott et al. | |
| 7,065,482 B2 | 6/2006 | Shorey et al. | |
| 7,072,917 B2 | 7/2006 | Wong et al. | |
| 7,075,924 B2 | 7/2006 | Richter et al. | |
| 7,080,314 B1 | 7/2006 | Garofalakis et al. | |
| 7,089,286 B1 | 8/2006 | Malik | |
| 7,089,491 B2 | 8/2006 | Feinberg et al. | |
| 7,111,115 B2 | 9/2006 | Peters et al. | |
| 7,113,962 B1 | 9/2006 | Kee et al. | |
| 7,113,996 B2 | 9/2006 | Kronenberg | |
| 7,120,728 B2 | 10/2006 | Krakirian et al. | |
| 7,120,746 B2 | 10/2006 | Campbell et al. | |
| 7,127,556 B2 | 10/2006 | Blumenau et al. | |
| 7,133,863 B2 | 11/2006 | Teng et al. | |

| | | | | | | |
|---|---|---|---|---|---|---|
| 7,133,967 B2 | 11/2006 | Fujie et al. | 2002/0073105 A1 | 6/2002 | Noguchi et al. | |
| 7,143,146 B2 | 11/2006 | Nakatani et al. | 2002/0083118 A1 | 6/2002 | Sim | |
| 7,146,524 B2 | 12/2006 | Patel et al. | 2002/0087571 A1 | 7/2002 | Stapel et al. | |
| 7,155,466 B2 | 12/2006 | Rodriguez et al. | 2002/0087744 A1 | 7/2002 | Kitchin | |
| 7,165,095 B2 | 1/2007 | Sim | 2002/0087887 A1 | 7/2002 | Busam et al. | |
| 7,167,821 B2 | 1/2007 | Hardwick et al. | 2002/0099829 A1 | 7/2002 | Richards et al. | |
| 7,171,469 B2 | 1/2007 | Ackaouy et al. | 2002/0103823 A1 | 8/2002 | Jackson et al. | |
| 7,173,929 B1 | 2/2007 | Testardi | 2002/0133330 A1 | 9/2002 | Loisey et al. | |
| 7,191,163 B2 | 3/2007 | Herrera et al. | 2002/0133491 A1 | 9/2002 | Sim et al. | |
| 7,194,579 B2 | 3/2007 | Robinson et al. | 2002/0143819 A1 | 10/2002 | Han et al. | |
| 7,228,359 B1 | 6/2007 | Monteiro | 2002/0143909 A1 | 10/2002 | Botz et al. | |
| 7,234,074 B2 | 6/2007 | Cohn et al. | 2002/0147630 A1 | 10/2002 | Rose et al. | |
| 7,236,491 B2 | 6/2007 | Tsao et al. | 2002/0150253 A1 | 10/2002 | Brezak et al. | |
| 7,240,100 B1 | 7/2007 | Wein et al. | 2002/0156905 A1 | 10/2002 | Weissman | |
| 7,280,536 B2 | 10/2007 | Testardi | 2002/0161911 A1 | 10/2002 | Pinckney, III et al. | |
| 7,284,150 B2 | 10/2007 | Ma et al. | 2002/0162118 A1 | 10/2002 | Levy et al. | |
| 7,292,541 B1 | 11/2007 | C S | 2002/0174216 A1 | 11/2002 | Shorey et al. | |
| 7,293,097 B2 | 11/2007 | Borr | 2002/0188667 A1 | 12/2002 | Kirnos | |
| 7,293,099 B1 | 11/2007 | Kalajan | 2002/0194112 A1 | 12/2002 | dePinto et al. | |
| 7,293,133 B1 | 11/2007 | Colgrove et al. | 2002/0194342 A1 | 12/2002 | Lu et al. | |
| 7,296,263 B1 | 11/2007 | Jacob | 2002/0198956 A1 | 12/2002 | Dunshea et al. | |
| 7,308,475 B1 | 12/2007 | Pruitt et al. | 2003/0009429 A1 | 1/2003 | Jameson | |
| 7,343,398 B1 | 3/2008 | Lownsbrough | 2003/0009528 A1 | 1/2003 | Sharif et al. | |
| 7,346,664 B2 | 3/2008 | Wong et al. | 2003/0012382 A1 | 1/2003 | Ferchichi et al. | |
| 7,383,288 B2 | 6/2008 | Miloushev et al. | 2003/0018450 A1 | 1/2003 | Carley | |
| 7,401,220 B2 | 7/2008 | Bolosky et al. | 2003/0018585 A1 | 1/2003 | Butler et al. | |
| 7,406,484 B1 | 7/2008 | Srinivasan et al. | 2003/0028514 A1 | 2/2003 | Lord et al. | |
| 7,409,440 B1 | 8/2008 | Jacob | 2003/0033308 A1 | 2/2003 | Patel et al. | |
| 7,415,488 B1 | 8/2008 | Muth et al. | 2003/0033535 A1 | 2/2003 | Fisher et al. | |
| 7,415,608 B2 | 8/2008 | Bolosky et al. | 2003/0055723 A1 | 3/2003 | English | |
| 7,440,982 B2 | 10/2008 | Lu et al. | 2003/0061240 A1 | 3/2003 | McCann et al. | |
| 7,457,982 B2 | 11/2008 | Rajan | 2003/0065956 A1 | 4/2003 | Belapurkar et al. | |
| 7,467,158 B2 | 12/2008 | Marinescu | 2003/0074301 A1 | 4/2003 | Solomon | |
| 7,475,241 B2 | 1/2009 | Patel et al. | 2003/0105846 A1 | 6/2003 | Zhao et al. | |
| 7,477,796 B2 | 1/2009 | Sasaki et al. | 2003/0115218 A1 | 6/2003 | Bobbitt et al. | |
| 7,509,322 B2 | 3/2009 | Miloushev et al. | 2003/0115439 A1 | 6/2003 | Mahalingam et al. | |
| 7,512,673 B2 | 3/2009 | Miloushev et al. | 2003/0128708 A1 | 7/2003 | Inoue et al. | |
| 7,519,813 B1 | 4/2009 | Cox et al. | 2003/0130945 A1 | 7/2003 | Force et al. | |
| 7,562,110 B2 | 7/2009 | Miloushev et al. | 2003/0139934 A1 | 7/2003 | Mandera | |
| 7,571,168 B2 | 8/2009 | Bahar et al. | 2003/0149781 A1 | 8/2003 | Yared et al. | |
| 7,574,433 B2 | 8/2009 | Engel | 2003/0156586 A1 | 8/2003 | Lee et al. | |
| 7,577,723 B2 | 8/2009 | Matsuda et al. | 2003/0159072 A1 | 8/2003 | Bellinger et al. | |
| 7,587,471 B2 | 9/2009 | Yasuda et al. | 2003/0171978 A1 | 9/2003 | Jenkins et al. | |
| 7,590,747 B2 | 9/2009 | Coates et al. | 2003/0177364 A1 | 9/2003 | Walsh et al. | |
| 7,599,941 B2 | 10/2009 | Bahar et al. | 2003/0177388 A1 | 9/2003 | Botz et al. | |
| 7,610,307 B2 | 10/2009 | Havewala et al. | 2003/0179755 A1 | 9/2003 | Fraser | |
| 7,610,390 B2 | 10/2009 | Yared et al. | 2003/0191812 A1 | 10/2003 | Agarwalla et al. | |
| 7,624,109 B2 | 11/2009 | Testardi | 2003/0195813 A1 | 10/2003 | Pallister et al. | |
| 7,639,883 B2 | 12/2009 | Gill | 2003/0204635 A1 | 10/2003 | Ko et al. | |
| 7,644,109 B2 | 1/2010 | Manley et al. | 2003/0212954 A1 | 11/2003 | Patrudu | |
| 7,653,699 B1 | 1/2010 | Colgrove et al. | 2003/0220835 A1 | 11/2003 | Barnes, Jr. | |
| 7,689,596 B2 | 3/2010 | Tsunoda | 2003/0229665 A1 | 12/2003 | Ryman | |
| 7,694,082 B2 | 4/2010 | Golding et al. | 2003/0236995 A1 | 12/2003 | Fretwell, Jr. | |
| 7,711,771 B2 | 5/2010 | Kirnos | 2004/0003266 A1 | 1/2004 | Moshir et al. | |
| 7,734,603 B1 | 6/2010 | McManis | 2004/0006575 A1 | 1/2004 | Visharam et al. | |
| 7,743,035 B2 | 6/2010 | Chen et al. | 2004/0006591 A1 | 1/2004 | Matsui et al. | |
| 7,752,294 B2 | 7/2010 | Meyer et al. | 2004/0010654 A1 | 1/2004 | Yasuda et al. | |
| 7,769,711 B2 | 8/2010 | Srinivasan et al. | 2004/0015783 A1 | 1/2004 | Lennon et al. | |
| 7,788,335 B2 | 8/2010 | Miloushev et al. | 2004/0017825 A1 | 1/2004 | Stanwood et al. | |
| 7,822,939 B1 | 10/2010 | Veprinsky et al. | 2004/0025013 A1 | 2/2004 | Parker et al. | |
| 7,831,639 B1 | 11/2010 | Panchbudhe et al. | 2004/0028043 A1 | 2/2004 | Maveli et al. | |
| 7,849,112 B2 | 12/2010 | Mane et al. | 2004/0028063 A1 | 2/2004 | Roy et al. | |
| 7,870,154 B2 | 1/2011 | Shitomi et al. | 2004/0030627 A1 | 2/2004 | Sedukhin | |
| 7,877,511 B1 | 1/2011 | Berger et al. | 2004/0030740 A1 | 2/2004 | Stelting | |
| 7,885,970 B2 | 2/2011 | Lacapra | 2004/0030857 A1 | 2/2004 | Krakirian et al. | |
| 7,913,053 B1 | 3/2011 | Newland | 2004/0043758 A1 | 3/2004 | Sorvari et al. | |
| 7,953,701 B2 | 5/2011 | Okitsu et al. | 2004/0054777 A1 | 3/2004 | Ackaouy et al. | |
| 7,958,347 B1 | 6/2011 | Ferguson | 2004/0059789 A1 | 3/2004 | Shum | |
| 8,005,953 B2 | 8/2011 | Miloushev et al. | 2004/0064544 A1 | 4/2004 | Barsness et al. | |
| 2001/0007560 A1 | 7/2001 | Masuda et al. | 2004/0064554 A1 | 4/2004 | Kuno et al. | |
| 2001/0014891 A1 | 8/2001 | Hoffert et al. | 2004/0093361 A1* | 5/2004 | Therrien et al. | 707/652 |
| 2001/0047293 A1 | 11/2001 | Waller et al. | 2004/0098383 A1 | 5/2004 | Tabellion et al. | |
| 2001/0051955 A1 | 12/2001 | Wong | 2004/0098595 A1 | 5/2004 | Aupperle et al. | |
| 2002/0012352 A1 | 1/2002 | Hansson et al. | 2004/0122926 A1 | 6/2004 | Moore et al. | |
| 2002/0035537 A1 | 3/2002 | Waller et al. | 2004/0123277 A1 | 6/2004 | Schrader et al. | |
| 2002/0038360 A1 | 3/2002 | Andrews et al. | 2004/0133605 A1 | 7/2004 | Chang et al. | |
| 2002/0059263 A1 | 5/2002 | Shima et al. | 2004/0133606 A1 | 7/2004 | Miloushev et al. | |
| 2002/0065810 A1 | 5/2002 | Bradley | 2004/0138858 A1 | 7/2004 | Carley | |
| 2002/0065848 A1 | 5/2002 | Walker et al. | 2004/0139355 A1 | 7/2004 | Axel et al. | |

| | | |
|---|---|---|
| 2004/0148380 A1 | 7/2004 | Meyer et al. |
| 2004/0153479 A1 | 8/2004 | Mikesell et al. |
| 2004/0167967 A1 | 8/2004 | Bastian et al. |
| 2004/0181605 A1 | 9/2004 | Nakatani et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2005/0021615 A1 | 1/2005 | Arnott et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0165656 A1 | 7/2005 | Frederick et al. |
| 2005/0175013 A1 | 8/2005 | Le Pennec et al. |
| 2005/0187866 A1 | 8/2005 | Lee |
| 2005/0198234 A1 | 9/2005 | Leib et al. |
| 2005/0198501 A1 | 9/2005 | Andreev et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0045096 A1 | 3/2006 | Farmer et al. |
| 2006/0047785 A1 | 3/2006 | Wang et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0112367 A1 | 5/2006 | Harris |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0259320 A1 | 11/2006 | LaSalle et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2007/0005807 A1 | 1/2007 | Wong |
| 2007/0016613 A1 | 1/2007 | Foresti et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0162891 A1 | 7/2007 | Burner et al. |
| 2007/0168320 A1 | 7/2007 | Borthakur et al. |
| 2007/0208748 A1 | 9/2007 | Li |
| 2007/0209075 A1 | 9/2007 | Coffman |
| 2007/0226331 A1 | 9/2007 | Srinivasan et al. |
| 2007/0233826 A1 | 10/2007 | Tindal et al. |
| 2008/0010372 A1 | 1/2008 | Khedouri et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0208917 A1* | 8/2008 | Smoot et al. .................. 707/652 |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0125955 A1 | 5/2009 | DeLorme |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0217163 A1* | 8/2009 | Jaroker ........................ 715/700 |
| 2009/0254592 A1 | 10/2009 | Marinov et al. |
| 2009/0265396 A1 | 10/2009 | Ram et al. |
| 2009/0300161 A1 | 12/2009 | Pruitt et al. |
| 2010/0064001 A1 | 3/2010 | Daily |
| 2010/0070476 A1* | 3/2010 | O'Keefe et al. ............... 707/640 |
| 2010/0179954 A1 | 7/2010 | Sebastian |
| 2010/0228819 A1* | 9/2010 | Wei .............................. 709/203 |
| 2010/0250497 A1* | 9/2010 | Redlich et al. ................ 707/661 |
| 2011/0087696 A1 | 4/2011 | Lacapra |
| 2012/0117028 A1* | 5/2012 | Gold et al. ..................... 707/640 |
| 2012/0150805 A1* | 6/2012 | Pafumi et al. ................. 707/640 |

FOREIGN PATENT DOCUMENTS

| | | |
|---|---|---|
| CA | 2512312 A1 | 7/2004 |
| EP | 0605088 A3 | 7/1994 |
| EP | 0 738 970 A1 | 10/1996 |
| EP | 1081918 A2 | 3/2001 |
| JP | 63010250 A | 1/1988 |
| JP | 06-205006 | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000183935 | 6/2000 |
| NZ | 566291 A | 12/2008 |
| WO | 00/58870 A2 | 10/2000 |
| WO | 02/39696 A2 | 5/2002 |
| WO | WO 02/056181 A2 | 7/2002 |
| WO | WO 2004/061605 A2 | 7/2004 |
| WO | 2006/091040 A1 | 8/2006 |
| WO | WO 2008/130983 A1 | 10/2008 |
| WO | WO 2008/147973 A2 | 12/2008 |

OTHER PUBLICATIONS

Blue Coat, "Technology Primer: CIFS Protocol Optimization," Blue Coat Systems Inc., 2007, pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks Inc., "Deploying the Big-IP LTM for Diameter Traffic Management" F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "Routing Global Internet Users to the Appropriate Data Center and Applications Using F5's 3-DNS Controller", F5

Networks Inc., Aug. 2001, pp. 1-4, Seattle, Washington, (http://www.f5.com/f5producs/3dns/relatedMaterials/UsingF5.html).

F5 Networks Inc., "Case Information Log for 'Issues with BoNY upgrade to 4.3'", as early as Feb. 2008.

F5 Networks Inc., "F5 WANJet CIFS Acceleration", White Paper, F5 Networks Inc., Mar. 2006, pp. 1-5, Seattle, Washington.

Fajardo V., "Open Diameter Software Architecture," Jun. 25, 2004, pp. 1-6, Version 1.0.7.

Gupta et al., "Algorithms for Packet Classification", Computer Systems Laboratory, Stanford University, CA, Mar./Apr. 2001, pp. 1-29.

Heinz G., "Priorities in Stream Transmission Control Protocol (SCTP) Multistreaming", Thesis submitted to the Faculty of the University of Delaware, Spring 2003, pp. 1-35.

Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Internet Protocol, "DARPA Internet Program Protocol Specification", (RFC:791), Information Sciences Institute, University of Southern California, Sep. 1981, pp. 1-49.

Kawamoto, D., "Amazon files for Web services patent", CNET News.com, Jul. 28, 2005, pp. 1-2, last accessed May 4, 2006, (http://news.com).

LaMonica M., "Infravio spiffs up Web services registry idea", CNET News.com, May 11, 2004, pp. 1-2, last accessed Sep. 20, 2004, (http://www.news.com).

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

Modiano E., "Scheduling Algorithms for Message Transmission Over a Satellite Broadcast System", MIT Lincoln Laboratory Advanced Network Group, Nov. 1997, pp. 1-7.

Nichols K., et al., "Definition of the Differentiated Services Field (DS Field) in the IPv4 and IPv6 Headers", (RFC:2474) Network Working Group, Dec. 1998, pp. 1-19, last accessed Oct. 8, 2012, (http://www.ietf.org/rfc/rfc2474.txt).

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

Rosen E., et al., "MPLS Label Stack Encoding", (RFC:3032) Network Working Group, Jan. 2001, pp. 1-22, last accessed Oct. 8, 2012, (http://www.ietf.org/rfc/rfc3032.txt).

Schilit B., "Bootstrapping Location-Enhanced Web Services", University of Washington, Dec. 4, 2003, (http://www.cs.washington.edu/news/colloq.info.html).

Seeley R., "Can Infravio technology revive UDDI?", ADTmag.com, Oct. 22, 2003, last accessed Sep. 30, 2004, (http://www.adtmag.com).

Shohoud, Y., "Building XML Web Services with VB .NET and VB 6", Addison Wesley, 2002, pp. 1-14.

Sommers F., "Whats New in UDDI 3.0—Part 1", Web Services Papers, Jan. 27, 2003, pp. 1-4, last accessed Mar. 31, 2004, (http://www.webservices.org/index.php/article/articleprint/871/-1/24/).

Sommers F., "Whats New in UDDI 3.0—Part 2", Web Services Papers, Mar. 2, 2003, pp. 1-8, last accessed Nov. 1, 2007, (http://www.web.archive.org/web/20040620131006/).

Sommers F., "Whats New in UDDI 3.0—Part 3", Web Services Papers, Sep. 2, 2003, pp. 1-4, last accessed Mar. 31, 2007, (http://www.webservices.org/index.php/article/articleprint/894/-1/24/).

Sleeper B., "The Evolution of UDDI" UDDI.org White Paper, The Stencil Group, Inc., Jul. 19, 2002, pp. 1-15, San Francisco, California.

Sleeper B., "Why UDDI Will Succeed, Quietly: Two Factors Push Web Services Forward", The Stencil Group, Inc., Apr. 2001, pp. 1-7, San Francisco, California.

"UDDI Overview", Sep. 6, 2000, pp. 1-21, uddi.org, (http://www.uddi.org/).

"UDDI Version 3.0.1" UDDI Spec Technical Committee Specification, Oct. 14, 2003, pp. 1-383, uddi.org, (http://www.uddi.org/).

"UDDI Technical White Paper," Sep. 6, 2000, pp. 1-12, uddi-org, (http://www.uddi.org/).

Wang B., "Priority and realtime data transfer over the best-effort Internet", Dissertation Abstract, 2005, ScholarWorks@UMASS.

Wikipedia, "Diameter (protocol)", pp. 1-11, last accessed Oct. 27, 2010, (http://en.wikipedia.org/wiki/Diameter_(protocol)).

Woo T.Y.C., "A Modular Approach to Packet Classification: Algorithms and Results", Bell Laboratories, Lucent Technologies, Mar. 2000, pp. 1-10.

"The AFS File System in Distributed Computing Environment," www.transarc.ibm.com/Library/whitepapers/AFS/afsoverview.html, last accessed on Dec. 20, 2002.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, Association for Computing Machinery, Inc.

Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org <http ://web. archive.org/web/20041123005335/developer.apple.com/macosx/tiger/spotlight.html>, pp. 1-6.

"A Storage Architecture Guide," Second Edition, 2001, Auspex Systems, Inc., www.auspex.com, last accessed on Dec. 30, 2002.

Basney et al., "Credential Wallets: A Classification of Credential Repositories Highlighting MyProxy," TPRC 2003, Sep. 19-21, 2003, pp. 1-20.

Botzum, Keys, "Single Sign on—A Contrarian View," Open Group Website, <http://www.opengroup.org/security/topics.htm>, Aug. 6, 2001, pp. 1-8.

Cabrera et al., "Swift: A Storage Architecture for Large Objects," In Proceedings of the-Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.

Cavale, M. R., "Introducing Microsoft Cluster Service (MSCS) in the Windows Server 2003", Microsoft Corporation, Nov. 2002.

"CSA Persistent File System Technology," A White Paper, Jan. 1, 1999, p. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072120509.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT/US02/00720, Jul. 8, 2004.

International Search Report from International Application No. PCT/US03/41202, mailed Sep. 15, 2005.

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13th LISA Conf, 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http ://searchstorage.techtarget.com/news/article/0,289142,sid5_gci1527986,00.html>.

Long et al., "Swift/RAID: A distributed RAID System", Computing Systems, Summer 1994, vol. 7, pp. 333-359.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Novotny et al., "An Online Credential Repository for the Grid: MyProxy," 2001, pp. 1-8.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, Jun. 1990, pp. 1-4, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Response filed Jul. 6, 2007 to Office action dated Feb. 6, 2007 for related patent U.S. Appl. No. 10/336,784.

Response filed Mar. 20, 2008 to Final Office action dated Sep. 21, 2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.

RSYNC, "Welcome to the RSYNC Web Pages," Retrieved from the Internet URL: http://samba.anu.edu.ut.rsync/. (Retrieved on Dec. 18, 2009).

Savage, et al., "AFRAID—A Frequently Redundant Array of Independent Disks," Jan. 22-26, 1996, pp. 1-13, USENIX Technical Conference, San Diego, California.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

Soltis et al., "The Global File System," Sep. 17-19, 1996, in Proceedings of the Fifth NASA Goddard Space Flight Center Conference on Mass Storage Systems and Technologies, College Park, Maryland.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, pp. 1-4, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

Wilkes, J., et al., "The HP AutoRAID Hierarchical Storage System," Feb. 1996, vol. 14, No. 1, ACM Transactions on Computer Systems.

"Windows Clustering Technologies—An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

* cited by examiner

SYSTEM FOR MITIGATING FILE VIRTUALIZATION STORAGE IMPORT LATENCY

FIELD

Various examples relate to mitigating latency in a file virtualization environment, and providing non-disruptively services to requesting client devices from a secondary data recovery data center site in the event that the primary data center site goes off-line.

BACKGROUND

In a file system virtualization environment, a configuration of the entire virtualized file system is stored in a file virtualization device. This configuration may represent one or more services representing one or more virtual file systems. However, in the event of a disaster rendering the entire virtualized file system in a malfunctioning or a completely inoperable state, it is difficult to immediately switch over to a secondary site to continue providing services to clients in a non-disruptive manner. Further, in the event of a partial failure rendering a portion of the virtual file system inoperable, it is difficult to immediately switch over those affected portions to a secondary site in a non-disruptive manner. In such conventional file systems, configuration information from the file virtualization device at a primary data center site has to be manually imported and then enabled at the data recovery or secondary data center site before failed services can be provided again. Further, in such conventional systems, when the failure is resolved at the primary data center site, similar manual techniques have to be applied again to switch all or a portion of failed services back to the primary data center site, thereby resulting in disruption of service to the client devices. Further, such manual techniques of failing a portion or all services over to the secondary site are not only time consuming, but are also highly error prone. In another scenario, if a customer deploying the file virtualization device elects to purchase newer, faster file virtualization device, existing snapshots are difficult to transfer to the new file virtualization device. Alternatively, if the customer wishes to split a virtual volume on a file virtualization device into two or more volumes, there is no technique or system that lets the new volumes to be automatically reflected in a new virtual snapshot that provides information about the splitting of the original volume into two or more volumes.

In yet another scenario, if a customer is using file server based replication for data and file virtualization device clusters are front-ending both primary and disaster recovery (or, backup) sites, conventional file virtualization systems fail to efficiently make the replicated configuration between the primary and the secondary data recovery data center site in real-time.

Furthermore, using current file virtualization devices, maintaining the configuration updates while at the same time performing operations such as reconfiguring a file switch, upgrading, renaming, mounting and/or unmounting a new volume, coalescing multiple volumes into a lesser number of volumes, splitting one volume into a plurality of volumes, and other events that alter the configuration is complex, time consuming, and error prone. Unfortunately, current file virtualization systems fail to address the above-noted and other problems associated with resolving latency issues and failing over to a secondary site smoothly.

SUMMARY

In an aspect, a back-up file virtualization device at a second data center site comprises a network interface component configured to communicate with an active file virtualization device at a first data center site via a communication channel on a scheduled basis; a memory configured to store machine executable code for reducing latency when re-routing at least partial client communications from a first data center site to a second data center site due to a virtualization service disruption; one or more processors coupled to the memory and configured to execute the code in the memory to: import configuration data from the first file virtualization device, wherein the imported configuration data is stored in the memory, the configuration data representing object relationships and mapping information between components in the first data center site and the second data center site; receive an instruction for the back-up file virtualization device to begin handling at least one virtualization service that is disrupted between the active file virtualization device and one or more storage devices at the first data center site; load, from the memory, a most recent import of at least a portion of the configuration data for the one or more disrupted virtualization services; enable the at least a portion of the loaded imported configuration data such that the back-up file virtualization device performs the disrupted virtualization service with one or more storage devices in the second data center site using the at least a portion of the imported configuration data.

In an aspect, a file virtualization system comprises a first data center site including one or more active first virtualization devices and one or more first storage devices, wherein the first virtualization device is configured to handle one or more virtualization services between one or more client devices and the one or more first storage device; a second data center site including one or more second file virtualization devices and one or more second storage devices, at least one second file virtualization devices further comprising: a network interface component configured to communicate with the first file virtualization device via a communication channel on a scheduled basis; a memory configured to store machine executable code for reducing latency when re-routing at least partial client communications from the first data center site to the second data center site due to a virtualization service disruption; one or more processors coupled to the memory and configured to execute the code in the memory to: import configuration data from the first file virtualization device, wherein the imported configuration data is stored in the memory, the configuration data representing object relationships and mapping information between components in the first data center site and the second data center site; receive an instruction for the back-up file virtualization device to begin handling at least one virtualization service that is disrupted between the active file virtualization device and one or more storage devices at the first data center site; load, from the memory, a most recent import of at least a portion of the configuration data for the one or more disrupted virtualization services; enable the at least a portion of the loaded imported configuration data such that the back-up file virtualization device performs the disrupted virtualization service with one or more storage devices in the second data center site using the at least a portion of the imported configuration data.

In one or more of the above aspects, the virtualization service disruption is caused by the active file virtualization device at the first data center failing, wherein the back-up file virtualization device enables configuration data to handle all virtualization services previously handled by the failed file virtualization device of the first data center.

In one or more of the above aspects, the virtualization service disruption is caused by one or more storage devices at the first data center failing, wherein the back-up file virtualization device enables a portion of the configuration data to begin handling the disrupted virtualization service with the one or more storage devices at the second data center.

In one or more of the above aspects, the network communications relating to the disrupted virtualization service at the first data center is received at the back-up file virtualization device at the second data center site. In one or more the above aspects, all virtualization services at the first data center become disrupted, and all corresponding back-up virtualization devices at the second data center enable the configuration data to handle all the virtualization services previously handled at the first data center site.

In one or more of the above aspects, wherein one or more virtualization services at the first data center are not disrupted between file virtualization devices and storage devices at the first data center. The corresponding back-up virtualization devices at the second data center do not enable portions of the configuration data associated with the one or more non-disrupted virtualization services.

In one or more of the above aspects, wherein the imported configuration data received at the back-up file virtualization device includes objects in a disabled state, wherein the disabled objects are enabled upon the enabling of the at least a portion of the configuration data by the back-up virtualization device.

In one or more of the above aspects, conflicts in the back-up file virtualization device are avoided between enabled objects from the configuration data and objects already executing and being handled by the back-up virtualization device.

In one or more of the above aspects, wherein the back-up virtualization device is configured to change a state of one or more components in the back-up file virtualization system from a read-only state to a read/write state when the back-up virtualization device operates in the active mode.

In one or more of the above aspects, at least a portion of the configuration data is exported from the back-up virtualization device to its corresponding virtualization device at the first data center site on a scheduled basis via the communication channel after at least a portion of the first data center site is back on-line, wherein the at least a portion of the imported configuration data is stored in a memory of the receiving virtualization device.

In one or more of the above aspects, the receiving virtualization device at the first data center is instructed to begin handling the previously disrupted virtualization service, wherein the receiving virtualization device loads the most recently received import of the at least a portion of the configuration data from the memory and enables a portion of the configuration data associated with the previously disrupted virtualization service. The virtualization service at the back-up virtualization device is then disabled.

DETAILED DESCRIPTION

Figure 1A:
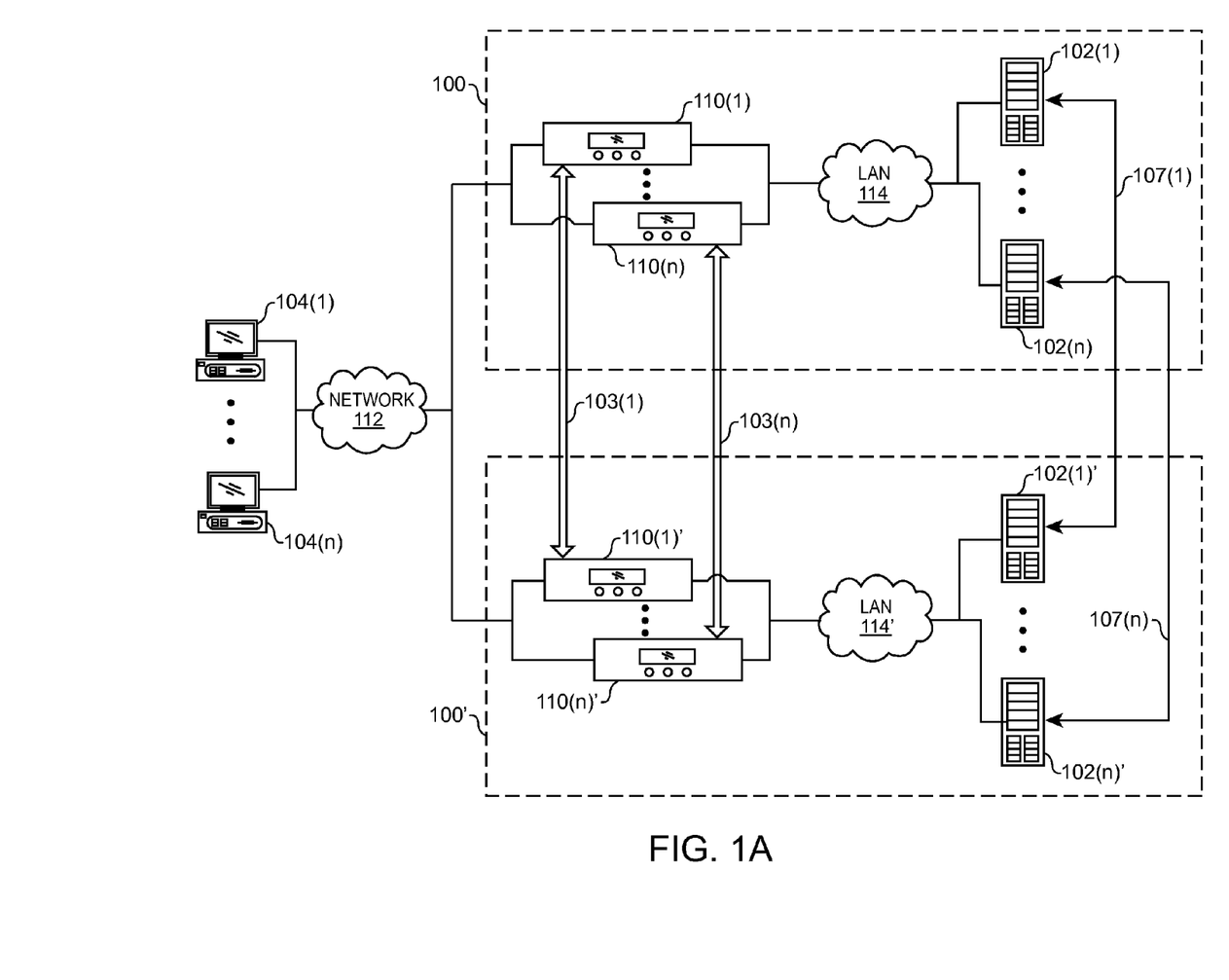
FIG. 1A is an example of system including a first active data center site in communication with a second non-active data center site in accordance with an aspect of the present disclosure.

FIG. 1A is an example of system including a first active data center site in communication with a second non-active data center site in accordance with an aspect of the present disclosure. In an aspect, both the first data center site 100 and the second data center site 100' are heterogeneous in terms of network components, although the examples disclosed herein may be utilized in homogeneous network storage systems with one or more virtual file server storage devices and one or more file virtualization devices.

For purposes of discussion, the first data center site 100 is described in terms of a virtualization site that utilizes one or more file virtualization devices 110(1)-110(n) which, when in an active state, host active services and operates to handle and execute various virtualization services between client devices and hardware devices, such as virtual file server storage devices 102(1)-102(n). Additionally, the second data center site 100' is described in terms of a virtualization site that utilizes one or more file virtualization devices 110(1)'-110(n)' which, when in an active state, handle and execute various virtualization services between client devices and the hardware devices, such as virtual file server storage devices 102(1)'-102(n)'. It should be noted that although only a first data center site 100 and a second data center site 100' are illustrated and described, additional data center sites may be employed in the environment.

In this example, the network 112 comprises a publicly accessible network, for example, the Internet, which includes client devices 104(1)-104(n), although the network 112 may comprise other types of private and public networks that include other devices. Communications, such as read and write requests between client devices 104(1)-104(n) and storage devices 102(1)-102(n), take place over the network 112 according to standard network protocols, such as the HTTP, TCP/IP, request for comments (RFC) protocols, Common Internet File System (CIFS) protocols, Network File System (NFS) protocols and the like. However, it should be noted that such protocols are exemplary and are not limited thereto as other application protocols be used.

Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent between network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 112 can include any communication medium and method by which data may travel between client devices 104(1)-104(n), storage devices 102(1)-102(n) and file virtualization devices 110.

LANs 114 and 114' can include a private local area network that allows communications between file virtualization devices 110 and 110' and one or more storage devices 102(1)-102(n), although the LANs 114 and 114' may comprise other types of private and public networks with other devices.

Storage devices 102(1)-102(n) and 102(1)'-102(n)' comprise one or more network devices capable of performing operations such as, for example, storing files and data in a virtualized file system. In an aspect, storage devices 102(1)-102(n) and 102(1)'-102(n)' are accessed by client devices 104(1)-104(n) via the file virtualization device 110 whereby the file virtualization device 110 selectively stores to and retrieves files from storage devices 102(1)-102(n) through the virtualization layer. In FIG. 1A, although two storage devices 102(1)-102(n) are shown in each of the data center sites 100 and 100', but it should be understood that any number of storage devices can be used.

In an aspect, storage devices 102(1)-102(n) can comprise heterogeneous file server storage devices or systems provided by independent vendors. Further, according to various examples, storage devices 102(1)-102(n) can be used to form a tiered storage arrangement where high priority data and/or frequently accessed data is stored in fast, more expensive storage devices, whereas low priority and/or relatively less accessed data can be stored in slower, less expensive storage devices. Such storage tiering can be, for example, based upon a time stamp based policy engine, although other types of policies (e.g., data size based policies and the like) may be used. A series of applications run on the storage devices 102(1)-102(n) that allow the transmission of data, cookies, descriptor files, namespace data, and other file system data. The storage devices 102(1)-102(n) can provide data or receive data in response to requests from the client devices 104(1)-104(n). In an aspect, storage device 102(1)-102(n) and 102(1)'-102(n)' may store and/or provide other data representative of requested resources, such as particular Web page(s), image(s) of physical objects, and any other objects.

As shown in FIG. 1A, client devices 104(1)-104(n) communicate with the storage devices 102(1)-102(n) via the file virtualization device 110, whereby the client devices 104(1)-104(n) make requests to retrieve as well as send data to the storage devices 102(1)-102(n) via the network 112. Although two client devices 104(1) and 104(n) are shown in FIG. 1A, any number of "n" client devices can be used the exemplary data center sites 100 and 100' as well. The ellipses and the designation "n" in FIG. 1A denote an unlimited number of storage devices, file virtualization devices, and/or client devices. Generally, client devices 104(1)-104(n) can include virtually any network device capable of connecting to another network device to send and receive information, including Web-based information. The set of such devices can include devices that typically connect using a wired (and/or wireless) communications medium, such as personal computers (e.g., desktops, laptops, tablets), smart TVs, stand alone multimedia boxes, mobile and/or smart phones and the like.

Each of the storage devices 102(1)-102(n), file virtualization devices 110, and client devices 104(1)-104(n) can include a central processing unit (CPU), controller or processor, a memory, and an interface system which are coupled together by a bus or other link, although other numbers and types of each of the components and other configurations and locations for the components can be used.

Generally, the file virtualization devices 110, 110' are enterprise-class intelligent file virtualization systems that simplify storage management and lower total storage management costs. In an aspect, the file virtualization devices 110, 110' automate data management tasks and eliminate the disruption associated with storage management operations. The file virtualization devices 110, 110' provide a virtual layer of intelligence between the network 112 and the respective storage devices via their corresponding LANs 114, 114'. The file virtualization devices 110, 110' thus eliminate the inflexible mapping which typically ties client devices to physical file storage devices. The file virtualization device 110 decouples the logical access to files from their physical location, so files are free to move among different storage devices, which are now free to change without disrupting users, applications, or administrators. The file virtualization devices 110, 110' implement intelligent file virtualization that simplifies data management further by providing automated, policy-based management across heterogeneous storage environments.

An example file virtualization device can be the ARX® Series devices provided by F5 networks, Inc. of Seattle, Wash. The file virtualization device can be configured to plug directly into existing IP/Ethernet network 112 and/or LAN 114, in substantial real-time. The file virtualization devices 110, 110' are configured to virtualize heterogeneous file storage devices 102(1)-102(n), 102(1)'-102(n)' that present file systems via NFS and/or CIFS, for example.

In an example, the file virtualization device 110, 110' do not connect directly to a storage area network (SAN) but instead manages SAN data presented through a gateway or storage device, without changing the existing infrastructure of the system 100. The file virtualization device(s) appear as a single data storage device to client devices 104(1)-104(n), and as a single CIFS or NFS client to their respective storage devices. In an aspect, the file virtualization devices can be configured to carry out data management operations, although the file virtualization devices can additionally or alternative carry out storage management operations.

For example, the file virtualization devices 110, 110' may be configured to automate common storage management tasks (e.g., data migration, storage tiering, and/or load balancing), which take place without affecting access to the file data or requiring re-configuration of file system(s) on client devices 104(1)-104(n). The file virtualization device manages metadata that tracks the location of files and directories that are distributed across storage devices, which is stored in configuration data. The file virtualization device uses the configuration data to utilizes namespace data, which is an aggregation of the underlying file systems, and as well as masked changes to the underlying storage systems from users and applications of client devices 104(1)-104(n). The file virtualization devices manage the various object relationships in the configuration data associated with individual volumes and shares by storing them in a configuration database, as will be described below.

In an aspect, file server storage devices 102(1)-102(n) of the active data center site 100 continually replicate their housed content and other data to the storage devices 102(1)'-102(n)' of the non-active data center site 100', as shown by arrows 107(1)-107(n) in FIG. 1A. The replication can be performed using one or more mirroring techniques, whereby the updated data is sent along communication lines independent of the communication channel 103 shown in FIG. 1A. The content data is replicated among the storage devices in the two sites 100, 100', whereby the content data is also correspondingly mapped such that the content is stored in the appropriate storage devices.

The file virtualization devices 110, 110' at the respective first data center site 100 and the second data center site 100' communicate with each other over a secure or insecure communication link or channel 103. In an aspect, the communication link 103 could be a dedicated Secure Sockets Layer (SSL) tunnel or channel 103 which is independent of the communication channels used by storage devices 102(1)-102(n) and 102(1)'-102(n)' to replicate their corresponding stored content data.

The file virtualization device(s) 110(1)-110(n) of the first data center site 100 provides configuration data to the file virtualization devices 110(1)'-110(n)' of the second data center site 100' via the channel 103. In particular, each file virtualization device at a data center site has a corresponding file virtualization device at the other data center site, whereby the configuration data is periodically exported from the active file virtualization device(s) 110(1)-110(n) to the non-active file virtualization device(s) 110(1)'-110(n)' in accordance with a predetermined schedule. The non-active file virtualization device(s) 110(1)'-110(n)', upon receiving the imported configuration data, will store the configuration data in the configuration database(s) 150. It should be noted that the configuration data stored in the non-active file virtualization device 110(1)'-110(n)' is not enabled, as will be discussed in more detail below.

In an aspect, the configuration data is transmitted from the active file virtualization device(s) 110(1)-110(n) to the corresponding non-active file virtualization device(s) 110(1)'-110(n)' in accordance with a seamless import process described in more detail in co-pending U.S. patent application Ser. No. 13/024,147, which is hereby incorporated by reference. It is contemplated that other import/export techniques may be used to replicate the configuration data among the file virtualization devices without being limiting in any way.

In general, the configuration data contains information representative of object relationships and mapping information among hardware and software components in the first and second data center sites 100, 100'. In an aspect, the configuration data may include, but is not limited to, IP addresses of network devices (e.g. servers, storage devices and the like) at the primary and secondary data center sites 100, 100'; IP addresses of services hosted on the file virtualization devices at both data center sites; session IDs of existing connections; information describing the equivalent file systems participating in a file virtualization layer for each site implemented by respective file virtualization devices; information describing the locations and capabilities of databases and processing nodes in the data center sites. The configuration data may present this data as a mapping scheme/table stored in mapping registers or other hardware, one or more cookie files and/or hash tables, although other numbers and types of systems can be used and other numbers and types of functions can be performed.

As discussed, each file virtualization device in a data center site has a corresponding mirrored file virtualization device in another data center site that can serve as a backup when there is a disruption in a virtual service. In the example shown in FIG. 1A, file virtualization device 110(1) in data center site 100 has a corresponding file virtualization device 110(1)' in data center site 100', whereby file virtualization device 110(1)' can serve as a backup to file virtualization device 110(1) in the event of a fail-over (and vice versa) caused by a disruption in one or more virtual services.

A virtualization service becomes disrupted if one or more file virtualization device fail and/or if one or more file storage devices 102(1)-102(n) fail. The failure can occur as a result of a catastrophic disaster, equipment breakdown, or equipment/software upgrade.

In the event that the disruption in service one or more file virtualization devices fail, the non-active file virtualization devices 110(1)'-110(n)' at the second data center site 100', which correspond to the one or more failed file virtualization devices 110(1)-110(n), are activated and begin to handle virtual services between one or more client devices 104(1)-104(n) and the one or more storage devices 102(1)'-102(n)' of the second data center site 100' with minimal disruption and latency. The one or more file virtualization devices 110(1)-110(n) first data center site 100, upon becoming non-active, can then serve as a back up and/or again become active once placed back on-line.

In an example scenario, the first data center site may include three file virtualization devices, whereby only one file virtualization device becomes inactive while the remaining two file virtualization devices remain active. In this example scenario, the file virtualization device at the second data center which corresponds to the inactive file virtualization device in the first data center site becomes active and begins handling network services between one or more client devices 104(1)-104(n) and the one or more storage devices 102(1)'-102(n)' of the second data center site. However, considering that the remaining file virtualization devices at the first data center site are active, their corresponding file virtualization devices at the second data center site do not need to be activated.

In an example scenario, all of the file virtualization devices 110(1)-110(n) in the first data center site 100 may become inactive and go-offline. In this example scenario, all of the corresponding file virtualization devices 110(1)'-110(n)' in the second data center site 100' become active and begin handling network services between one or more client devices 104(1)-104(n) and the one or more storage devices 102(1)'-102(n)' of the second data center site 100' with minimal disruption and latency. This example scenario is referred to as "passive-active" considering all of the file virtualization devices at one data center site are inactive.

The file virtualization devices 110, 110' are used to implement a virtualization layer that is transparent to the client devices 104(1)-104(n), whereby the file virtualization devices 110, 110' are able to communicate with the selected file server storage devices 102(1)-102(n) over the virtualization layer. Each file virtualization device is configured to store configuration data which describes a state of the complete virtual file system for the data center 110 at a point in time. The configuration data is able to be sent from a file virtualization device in an active data center to one or more other file virtualization devices in a non-active data center when a fail-over occurs. In particular, the configuration data is loaded and enabled by the non-active file virtualization device to reproduce the complete virtual file system of the data center site that will be going off-line, wherein reproduction of the complete virtual file system occurs quickly to allow the newly active data center to take over without disrupting services provided to the users of client devices 104(1)-104(n).

Each active file virtualization device handles a plurality of virtualization services between a plurality of client devices 104 and a plurality of storage devices 102. In particular, one type of virtualization service performed by a file virtualization device can involve the file virtualization device storing and/or retrieving portions of data among one or more storage devices for one file virtualization service. In the event that one or more file storage devices 102 fails or stops functioning properly, the one or more file virtualization devices, tasked with handing file virtualization services between client devices and the failed file storage device(s), will consider the storage device 102 to be inactive, and will thus initiate the fail over process to the non-active file virtualization device. In particular to this example event, the corresponding file virtualization device at the second data center site, upon being activated, will only handle the virtualization services which involve the one or more storage devices in the second data center which correspond with the one or more failed storage devices in the first data center.

For example, a first data center site may contain three file virtualization devices (file virtualization devices A, B and C) and four storage devices (storage devices A, B, C, and D). Similarly, a second data center site may contain three file virtualization devices (file virtualization devices A', B' and C') and four storage devices (storage devices A', B', C', and D'), whereby the file virtualization devices and storage devices correspond to their respective paired devices in the first data center. In the example, file virtualization device A may handle a virtualization service A that has virtual IP addresses which require file virtualization device A to access storage devices A and B. Additionally, in the example, file virtualization device B may handle virtualization service B that has virtual IP addresses which require file virtualization device B to access storage devices B and C. Moreover, in the example, file virtualization device C may handle virtualization services C1 and C2 that has virtual IP addresses which require file virtualization device C to access storage devices A and D for virtualization service C1 and storage devices C and D for virtualization service C2. In the example, if storage device A fails, file virtualization devices A and C are affected as their virtualization services have virtual IP addresses which require access to storage device A (and potentially other storage devices). Accordingly, virtualization services A and C1 must be handled by the corresponding file virtualization devices A' and C' to ensure that virtualization services A and C1 continue to be provided to the client device with minimal disruption and latency. In particular, file virtualization devices A' and C' activate and enable configuration data for virtualization services A and C1, such that file virtualization devices A' and C' are able to provide these services between the one or more client devices and the storage device A'. In the present example, file virtualization device C also accesses storage devices C and D when performing virtual service C2. Considering that storage devices C and D are functioning properly in this example, file virtualization device C continues to perform virtual service C2 and thus does not fail over that virtual service C to file virtualization device C'. This is an "active-active" scenario, wherein one or more file virtualization devices in both data center sites are in active operation.

Figure 1B:
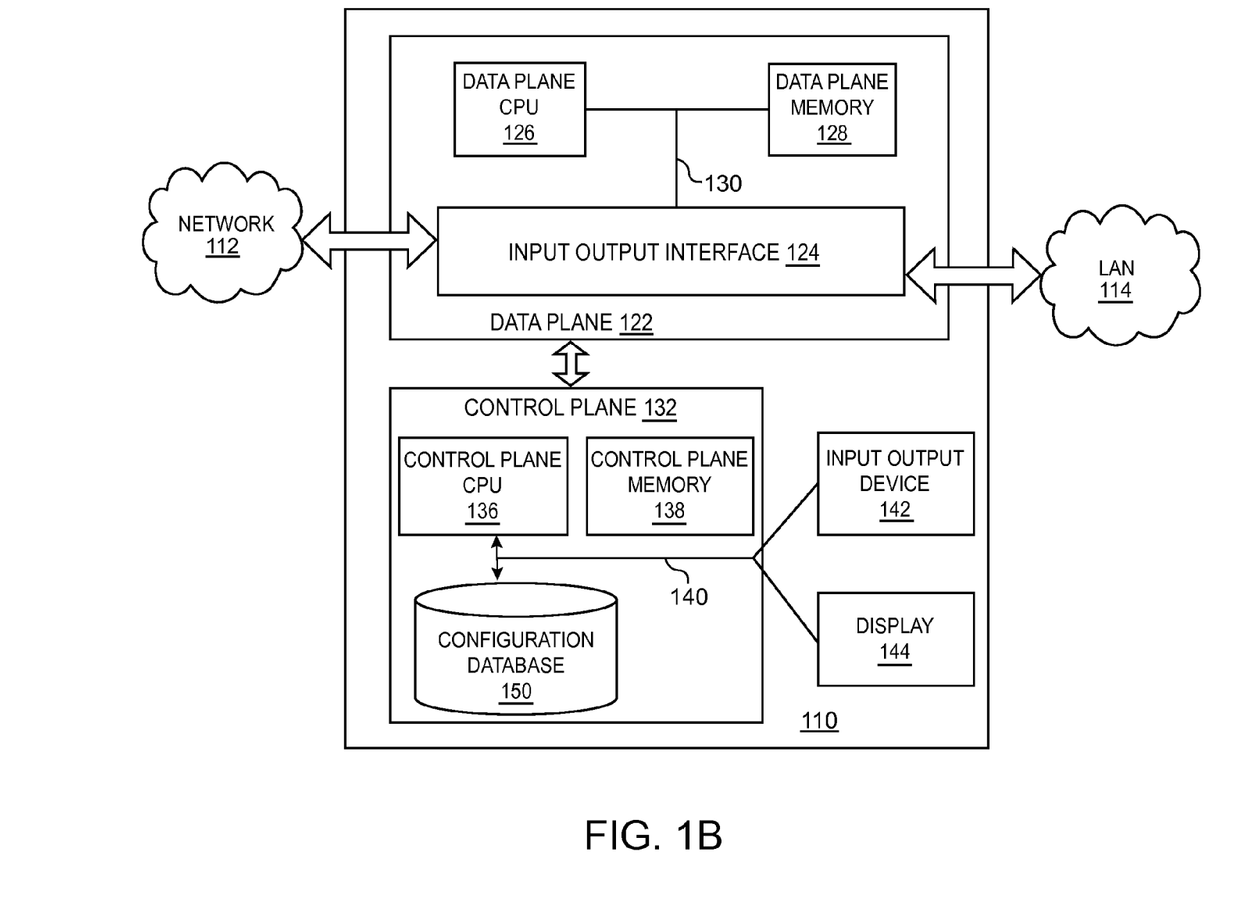
FIG. 1B is a block diagram of an example file virtualization device in accordance with an aspect of the present disclosure.

FIG. 1B is a block diagram of an example file virtualization device in accordance with an aspect of the present disclosure. As shown in FIG. 1B, the file virtualization device 110 includes one or more data planes 122, one or more control planes 132, one or more input-output devices 142 and one or more displays 144.

The input-output interface 124 is configured to allow the file virtualization device 110 to communicate with other network devices, such as another file virtualization device 110', via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Input-output device 142 may in some examples connect to multiple input-output devices external to file virtualization device 110. Some examples of the input-output device 142 may be configured to provide storage or an installation medium, while others may provide a universal serial bus (USB) interface for receiving USB storage devices such as the USB Flash Drive line of devices manufactured by Twintech Industry, Inc. Still other examples of the input-output device 142 may be a bridge between the data plane bus 130, control plane bus 140, and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus. Further, file virtualization device 110A can be single powered or dual-powered depending upon specific user needs.

In an aspect, the data plane 122 of the file virtualization device 110 functions to provide a data path that handles non-metadata operations at wire speed. The control plane 132 of the file virtualization device 110 functions to provide handling of operations that affect metadata and migration of file data to and from storage devices 102(1)-102(n). In some other examples, control plane memory 138 can store an operating system used for file virtualization device 110, and log files generated during operation of file virtualization device 110. Each path provided by data plane 122 and control plane 132, respectively, has dedicated processing and memory resources and each can scale independently based upon varying network and storage conditions. In an aspect, the control plane 132 is configured to perform certain functions such as logging, reporting, port mirroring, and hosting Simple Network Management Protocol (SNMP) and other protocols.

In this example shown in FIG. 1B, the data plane 122 includes one or more data plane processors (CPU) 126, one or more data plane memories 128, and one or more input-output interfaces 124 coupled to each other through one or more internal data plane bus 130. Similarly, in this example, the control plane 132 includes one or more control plane processors (CPU) 136, one or more control plane memories 138 and one or more configuration databases 150, all coupled to one another via internal control plane bus 140. The configuration database 150 is configured to store object relationships of the configuration data and mapping information between the various objects in the file system managed by file virtualization device 110. Additionally, as shown in FIG. 1B, the control plane 132 is able to communicate with the input-output device 142 and the display 144 via the internal control plane bus 140.

Data plane CPU 126 and control plane CPU 136 can comprise one or more computer readable medium and logic circuits that respond to and process instructions fetched from the data plane memory 128; one or more microprocessor units, one or more microprocessors, one or more microcontrollers, and central processing units with a single processing core or a plurality of processing cores.

The data plane memory 128 and the control plane memory 138, can comprise: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), disk type memory, tape memory, spinning storage media, or any other type of memory device capable of executing the systems and methods described herein.

The data plane CPU 126 and the control plane CPU 136 execute one or more programs of stored instructions of one or more aspects which perform some or all of the processes described below in accordance with mitigating latency and minimizing interruption by activating the non-active file virtualization device after the first data center site 100 goes off-line. In particular, the data plane CPU 126 and the control plane CPU 136 communicate with the file virtualization device 110' at the non-active data center site 100' and instruct it to activate so that communications from the client devices 104(1)-104(n) are able to be redirected or rerouted to that file virtualization device 110' after the second data center site 100' has become active and can handle the client communications.

File virtualization device 110 can be configured in a manner that data plane CPU 126 and control plane CPU 136 may also include a computer readable medium having instructions stored thereon for automatic synchronizing of configuration information to a non-active file virtualization device 110' in the event that the active data center site 100 goes off-line.

By way of example only, data plane 122 and control plane 132 in file virtualization device 110A are configured to translate client requests received from client devices 104(1)-104(n) over network 112 at the input-output interface 124 of data plane 122 into request from the file virtualization device 110 to one or more storage devices 102(1)-102(n) over LAN 114. Upon receipt of the request, data plane 122 communicates with control plane 132 to search for virtual snapshot data related to the request in a configuration database 150. Control plane 132 returns data related to the request to data plane 122, which then forwards it to file data and metadata stores in storage devices 102(1)-102(n). Alternatively, file virtualization device 110 may be configured to receive responses from file data and metadata stores in storage devices 102(1)-102(n). In such a scenario, file virtualization device 110 can store the outcome of various file operations into a virtual snapshot, described in more detail in FIG. 2, in the configuration database 150.

In an aspect, the configuration database 150 can be a relational database including various fields, records, and files, used in conjunction with a database management system, although other types of databases may also be used. Although the configuration database 150 is shown in FIG. 1B as within the file virtualization device 110, the configuration database 150 may be attached physically outside the file virtualization device 110 as a separate component. In an aspect, the configuration database 150 contains all of the file virtualization device's 110 configuration information, such as one or more states of object relationships, data related to the network/IP addresses to use, the usernames/passwords to administer the file virtualization device 110, the virtualization layer description, the IP addresses client devices 104(1)-104(n) access to get to virtualized file systems, for example, primary file virtualization system 100, and other network and device related information for file virtualization cluster 110. In one example, configuration database 150 can be an object manager database (OMDB) that stores object mapping data for components in first data center site 100 and second data recovery data center site 100'. Further, configuration database 150 may be distributed among various rule and policy engines executing on file virtualization cluster 110.

Figure 2:
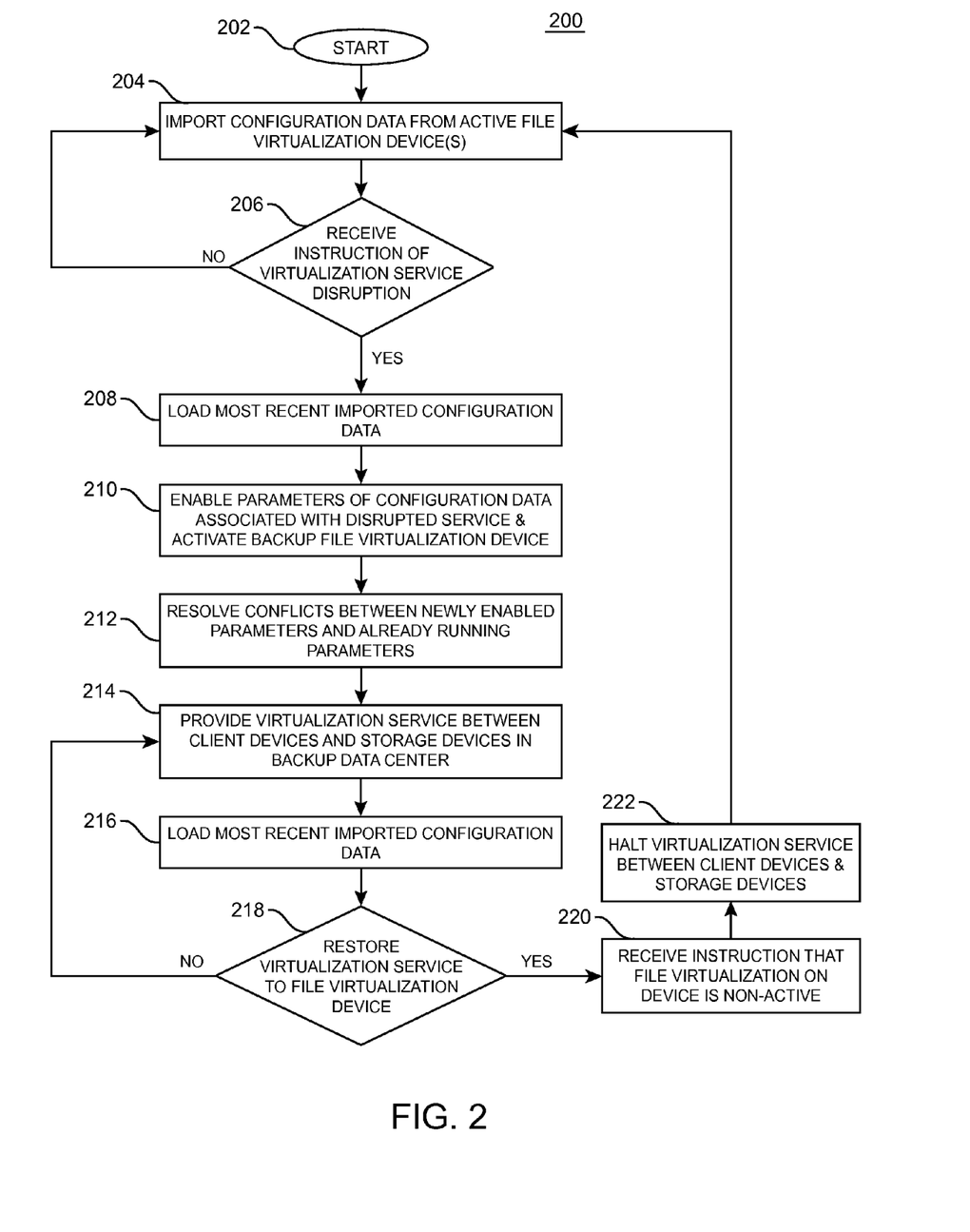
FIG. 2 illustrates a flow chart describing at least a portion of a process implemented and executed by the file virtualization devices at the first and second data center sites in accordance with an aspect of the present disclosure.

FIG. 2 illustrates a flow chart describing at least a portion of a process implemented and executed by the file virtualization devices at the first and second data center sites 100, 100' in accordance with an aspect of the present disclosure. As shown in FIG. 2, the process 200 begins at Start Block 202 wherein one or more file virtualization devices 110(1)-110(n) of the first data center site 100 is in active mode and is handling network traffic communications between the one or more client devices 104(1)-104(n) and the one or more storage devices 102(1)-102(n). Additionally, one or more corresponding file virtualization devices 110(1)'-110(n)' of the second data center site 100' are inactive and in stand-by mode for one or more virtualization services that currently being handled at the first data center site 100.

As stated above, files and stored objects are continuously replicated between the storage devices 102(1)-102(n) in the first data center 100 and the storage devices 102(1)'-102(n)' in the second data center 100', as represented by arrows 107(1)-107(n) in FIG. 1A. Additionally, one or more file virtualization devices 110(1)-110(n) in the first data center 100 periodically export some or all configuration data on an ongoing basis in accordance with a defined schedule to corresponding one or more file virtualization devices 110(1)'-110(n)' in the non-active second data center site 100' (Block 204). It should be noted that the portions of the imported configuration data that are associated with virtualization services being handled at the first data center 100 are not enabled and processed by the non-active file virtualization devices 110(1)'-110(n)'.

As indicated in Block 206, the process repeats back to Block 204 until the one or more non-active file virtualization devices 110(1)'-110(n)' receive an instruction from a network administrator that there has been one or more virtualization service disruptions at the first data center site 100. In an aspect, the virtualization service disruption may be due to failure of one or more file virtualization devices 110(1)-110(n) and/or one or more storage devices 102(1)-102(n) at the first data center site 110. In an aspect, the instruction provides information as to which of the file virtualization devices 110(1)'-110(n)' at the second data center site 100' will become active and which virtual services will need to be handled.

In an aspect, based on the information in the instruction, the one or more file virtualization devices 110(1)'-110(n)' load, from corresponding configuration database(s) 150, the configuration data most recently imported (Block 208). In an aspect, the configuration data will contain all of the parameters (e.g. site common parameters, site specific parameters, information regarding the virtual services which need to be taken over) which relate to the virtualization services that were being handled by the active file virtualization device 110(1)-110(n).

In particular, the one or more file virtualization devices 110(1)'-110(n)' will enable only the parameters associated with the one or more virtualization services that the back-up file virtualization devices will need to take over. Once these parameters are enabled at the back-up virtualization device(s) 110(1)'-110(n)', they will be able to handle the identified virtual services between the client devices 104(1)-104(n) and the storage devices 102(1)'-102(n)' in the second data center 100' (Block 210). In particular, once the configuration data is enabled by the file virtualization devices 110(1)'-110(n)', the now-active file virtualization devices 110(1)'-110(n)' are able to use the IP addresses for each virtualized service to effectively access contents from the storage devices 102(1)'-102(n)' in the second data center 100'.

As discussed above, the present system and method can be applied in for "active-active" failover scenarios or "passive-active" failover scenarios. For the "passive-active" failover scenario, all of the active file virtualization devices 110(1)-110(n) become inactive, whereby all of the file virtualization devices 110(1)'-110(n)' become enabled to thereafter handle all network communications (previously performed at the active first data center site 100 at the second data center site 100'. For the "active-active" failover scenario, at least one set of corresponding file virtualization devices 110(1)-110(n), 110(1)'-110(n)' remain active, as the service disruption is caused by one or more failed storage devices 102(1)-102(n).

Upon enabling the parameters from the configuration data, the file virtualization devices 110(1)'-110(n)' will resolve any conflicts that may arise between parameters that have been newly enabled and parameters that are already being executed at the second data center site 100' (Block 212). In an aspect, the file virtualization devices 110(1)'-110(n)' will allow already running parameters to continue to run while the newly enabled conflicting parameters will not be executed.

Once the file virtualization devices 110(1)'-110(n)' and the other components in the second data center site 100' are active and able to handle network traffic, client traffic is rerouted or redirected to the active second data center site 100' via the file virtualization devices 110(1)'-110(n)' (Block 214).

Thereafter, the roles between the file virtualization devices and storage devices in the first and second data centers are reversed for the fail-over virtualization service(s). In particular, content data of the storage devices 102(1)'-102(n)' in the second data center 100' are replicated in the storage devices 102(1)-102(n) in the first data center 100. Further, as shown in FIG. 2, configuration data is exported from the one or more file virtualization devices 110(1)'-110(n)' and imported at the one or more file virtualization devices 110(1)-110(n) in accordance with a predetermined schedule (Block 216).

This process repeats back to Block 214 until the file virtualization device(s) 110(1)'-110(n)' receives instructions that the virtualization service(s) are to be passed back to the file virtualization device(s) 110(1)-110(n) at the first data center site 100 (Block 218). Once the file virtualization device(s) 110(1)'-110(n)' receive confirmation that the file virtualization devices 110(1)-110(n) are back on-line and active, the file virtualization device(s) 110(1)'-110(n)' terminate handling the virtualization service(s) and go back into stand-by mode for those virtualization service (Block 220). The process repeats back to Block 204 wherein the file virtualization device(s) 110(1)'-110(n)' to import configuration data from the file virtualization device(s) 110(1)-110(n).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks using different types of file virtualization devices may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order.

What is claimed is:

1. A back-up file virtualization device at a second data center site comprising:
   a network interface component configured to communicate with an active file virtualization device at a first data center site via a communication channel on a scheduled basis;
   a memory configured to store machine executable code for reducing latency when re-routing at least partial client communications from a first data center site to a second data center site due to a virtualization service disruption;
   one or more processors coupled to the memory and configured to execute the code in the memory to:
      import configuration data from the first file virtualization device, wherein the imported configuration data is stored in the memory, the configuration data representing object relationships and mapping information between components in the first data center site and the second data center site;
      receive an instruction for the back-up file virtualization device to begin handling at least one virtualization service that is disrupted between the active file virtualization device and one or more storage devices at the first data center site;
      load, from the memory, a most recent import of at least a portion of the configuration data for the one or more disrupted virtualization services;
      enable the at least a portion of the loaded imported configuration data such that the back-up file virtualization device performs the disrupted virtualization service with one or more storage devices in the second data center site using the at least a portion of the imported configuration data.

2. The back-up file virtualization device of claim 1, wherein the virtualization service disruption is caused by the first file virtualization device at the first data center failing, wherein the back-up file virtualization device enables configuration data to handle all virtualization services previously handled by the failed file virtualization device of the first data center.

3. The back-up file virtualization device of claim 1, wherein the virtualization service disruption is caused by one or more storage devices at the first data center failing, wherein the back-up file virtualization device enables a portion of the configuration data to begin handling the disrupted virtualization service with the one or more storage devices at the second data center.

4. The back-up file virtualization device of claim 1, wherein the network communications relating to the disrupted virtualization service at the first data center is received at the back-up file virtualization device at the second data center site.

5. The back-up file virtualization device of claim 1, wherein all virtualization services at the first data center become disrupted, all corresponding back-up virtualization devices at the second data center enable the configuration data to handle all the virtualization services previously handled at the first data center site.

6. The back-up file virtualization device of claim 1, wherein one or more virtualization services at the first data center are not disrupted between file virtualization devices and storage devices at the first data center, wherein corresponding back-up virtualization devices at the second data center do not enable portions of the configuration data associated with the one or more non-disrupted virtualization services.

7. The back-up file virtualization device of claim 1, wherein the imported configuration data received at the back-up file virtualization device includes objects in a disabled state, wherein the disabled objects are enabled upon the enabling of the at least a portion of the configuration data by the back-up virtualization device.

8. The back-up file virtualization device of claim 1, wherein the processor is configured to avoid conflicts in the back-up file virtualization device between enabled objects from the configuration data and objects already executing and being handled by the back-up virtualization device.

9. The back-up file virtualization device of claim 1, wherein the back-up virtualization device is configured to change a state of one or more components in the back-up file virtualization system from a read-only state to a read/write state when the back-up virtualization device operates in the active mode.

10. The back-up file virtualization device of claim 1, wherein the back-up virtualization device is configured to export at least a portion of the configuration data from the back-up virtualization device to its corresponding virtualization device at the first data center site on a scheduled basis via the communication channel after at least a portion of the first data center site is back on-line, wherein the at least a portion of the imported configuration data is stored in a memory of the receiving virtualization device.

11. The back-up file virtualization device of claim 10, wherein the back-up virtualization device is configured to:
   instruct the receiving virtualization device at the first data center to begin handling the previously disrupted virtualization service, wherein the receiving virtualization device loads the most recently received import of the at least a portion of the configuration data from the memory and enables a portion of the configuration data associated with the previously disrupted virtualization service.

12. The back-up file virtualization device of claim 11, wherein the back-up device is configured to disenable the virtualization service and go back to the stand-by mode for the virtualization service.

13. A file virtualization system comprising:
- a first data center site including one or more active first virtualization devices and one or more first storage devices, wherein the first virtualization device is configured to handle one or more virtualization services between one or more client devices and the one or more first storage device;
- a second data center site including one or more second file virtualization devices and one or more second storage devices, at least one second file virtualization devices further comprising:
  - a network interface component configured to communicate with the first file virtualization device via a communication channel on a scheduled basis;
  - a memory configured to store machine executable code for reducing latency when re-routing at least partial client communications from the first data center site to the second data center site due to a virtualization service disruption;
  - one or more processors coupled to the memory and configured to execute the code in the memory to:
    - import configuration data from the first file virtualization device, wherein the imported configuration data is stored in the memory, the configuration data representing object relationships and mapping information between components in the first data center site and the second data center site;
    - receive an instruction for the back-up file virtualization device to begin handling at least one virtualization service that is disrupted between the active file virtualization device and one or more storage devices at the first data center site;
    - load, from the memory, a most recent import of at least a portion of the configuration data for the one or more disrupted virtualization services;
    - enable the at least a portion of the loaded imported configuration data such that the back-up file virtualization device performs the disrupted virtualization service with one or more storage devices in the second data center site using the at least a portion of the imported configuration data.

14. The file virtualization system of claim 13, wherein the virtualization service disruption is caused by the first file virtualization device at the first data center failing, wherein the second file virtualization device enables configuration data to handle all virtualization services previously handled by the failed first file virtualization device of the first data center.

15. The file virtualization system of claim 13, wherein the virtualization service disruption is caused by the first one or more storage devices at the first data center failing, wherein the second file virtualization device enables a portion of the configuration data to begin handling the disrupted virtualization service with the second one or more storage devices at the second data center.

16. The file virtualization system of claim 13, wherein the network communications relating to the disrupted virtualization service at the first data center is received at the second file virtualization device at the second data center site.

17. The file virtualization system of claim 13, wherein all virtualization services at the first data center become disrupted, all corresponding second file virtualization devices at the second data center enable the configuration data to handle all the virtualization services previously handled at the first data center site.

18. The file virtualization system of claim 13, wherein one or more virtualization services at the first data center are not disrupted between the first file virtualization devices and first storage devices, wherein corresponding second virtualization devices at the second data center do not enable portions of the configuration data associated with the one or more non-disrupted virtualization services.

19. The file virtualization system of claim 13, wherein the one or more second file virtualization devices are configured to export at least a portion of the configuration data to a corresponding one or more file virtualization devices at the first data center site on a scheduled basis via the communication channel after at least a portion of the first data center site is back on-line, wherein the at least a portion of the imported configuration data is stored in a memory of the receiving one or more corresponding first virtualization devices.

20. The file virtualization system of claim 13, wherein the one or more second file virtualization devices is configured to instruct the one or more first file virtualization devices at the first data center to begin handling the previously disrupted virtualization service, wherein the receiving file virtualization device loads the most recently received import of the at least a portion of the configuration data from the memory and enables a portion of the configuration data associated with the previously disrupted virtualization service, and wherein the one or more second file virtualization devices is configured to disenable the virtualization service.

* * * * *